United States Patent [19]

Schwöd

[11] Patent Number: 5,437,221
[45] Date of Patent: Aug. 1, 1995

[54] GRATE FOR A GRILL

[76] Inventor: Kurt Schwöd, Tulpenweg 2, Höhenkirchen/Siegertsbrunn, Germany, 85635

[21] Appl. No.: 256,730
[22] PCT Filed: Jan. 20, 1993
[86] PCT No.: PCT/EP93/00126
§ 371 Date: Oct. 12, 1994
§ 102(e) Date: Oct. 12, 1994
[87] PCT Pub. No.: WO93/13700
PCT Pub. Date: Jul. 22, 1993

[30] Foreign Application Priority Data
Jan. 21, 1992 [DE] Germany ............ 42 01 519.7

[51] Int. Cl.$^6$ .............................. A47J 27/00
[52] U.S. Cl. ................... 99/449; 126/41 R; 99/445
[58] Field of Search .............. 99/449, 444, 445; 726/41 R

[56] References Cited

U.S. PATENT DOCUMENTS

| | | | |
|---|---|---|---|
| 2,549,709 | 4/1951 | Potts et al. | |
| 4,553,523 | 11/1985 | Stohrer | 99/449 |
| 4,936,202 | 6/1990 | Lin | 99/444 |
| 5,347,978 | 9/1994 | Zuran | 99/445 |
| 5,355,868 | 10/1994 | Haen | 126/411 C |

FOREIGN PATENT DOCUMENTS

| | | |
|---|---|---|
| 859708 | 12/1940 | France . |
| 2154486 | 5/1972 | Germany . |
| 3715621 | 11/1988 | Germany . |

Primary Examiner—Carroll B. Dority
Attorney, Agent, or Firm—Fisher & Associates

[57] ABSTRACT

In a grate the bars (1, 2, 3, 4, 5, ...) of S-shaped cross section are combined to form two groups of bars (1, 3, 5, 7, ...; 2, 4, 6, 8, ...). The two groups form moving units longitudinally displaceable relative to each other. The profiling of the bars prevents fat from dripping into the fire. Pulling apart the two groups of bars exposes all surfaces of the bars so that they are easy to clean.

4 Claims, 1 Drawing Sheet

U.S. Patent     Aug. 1, 1995     5,437,221
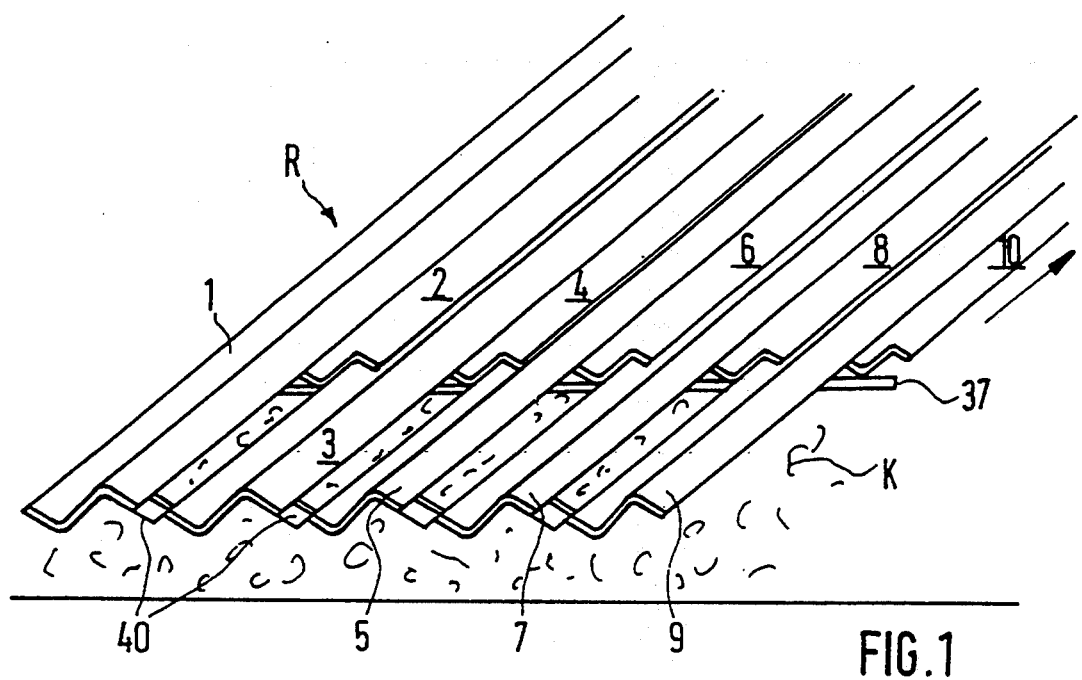
FIG.1
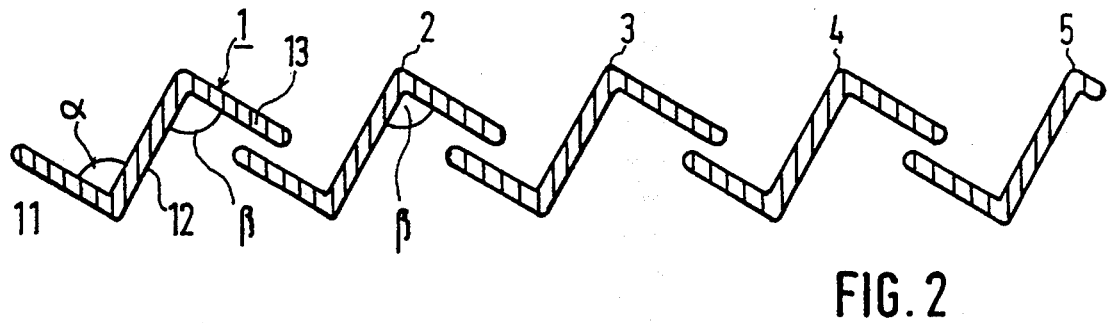
FIG.2
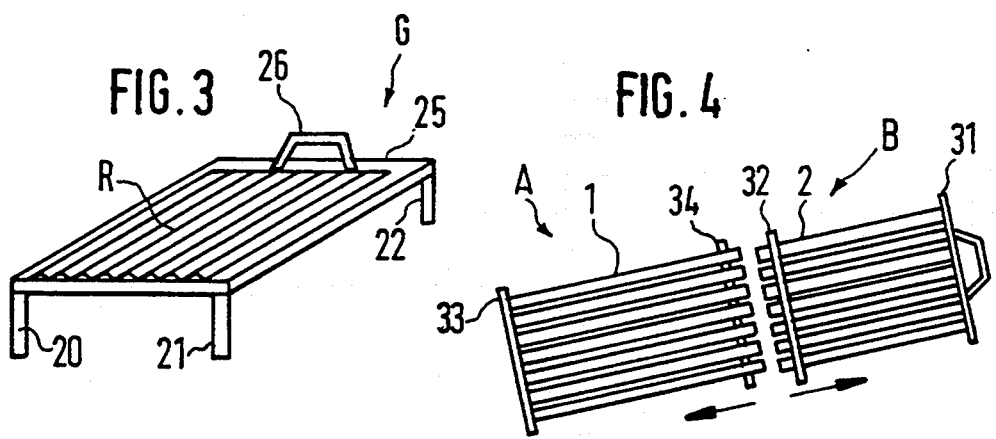
FIG.3
FIG.4

GRATE FOR A GRILL

The present invention relates to a bipartite, telescoping grate for a grill having a plurality of bars defining an upper grate plane for taking up food to be grilled.

In its simplest form a grate comprises a plurality of round metal bars welded together parallel a certain distance apart. Such a grate is disposed in a frame a certain distance above a charcoal fireplace. Such a simple grill is sufficient for many purposes. However a frequently undesirable concomitant phenomenon in grilling proves to be the dripping of fat from the food into the fire between the bars of the grate. With certain foods, for example fish, dripping fat leads to a bad smell that should be avoided particularly in densely built-up residential areas.

For this purpose it has been proposed to replace the spaced round bars by profile bars, for example bars of S-shaped cross section, disposed in partly overlapping fashion. The bars define an upper grate plane on which the food to be grilled is located. Fat dripping or running down from this plane collects in the grooves formed by the S-shaped profile of the bars (see e.g. DE 37 15 621 A1; DE 34 22 314 A1).

The staggered, substantially S-shaped bars are suitable for catching fat from the food being grilled, but the radiant heat from the glowing charcoal reaches the food only indirectly, i.e. after being reflected once or twice on the walls of the bars, whereas the food is directly exposed to the radiant heat in the simple grate with staggered round bars.

Furthermore the document U.S.-A-4 553 523 discloses a bipartite, telescoping grate provided with two units each comprising a number of parallel round bars that are displaceable relative to each other for the purpose of changing or adjusting the size of the resulting grate. But regardless of the extent to which the particular bars of the two grate units are pushed together, this known grate also involves the disadvantage that fat can drip from the food to be grilled through the gaps between two adjacent round bars of the resulting assembled grate into the charcoal fire below the grate, which can lead to the detrimental effects explained above.

The document U.S.-A-2 549 709 likewise discloses a bipartite grate, in particular grate for a grill, wherein two substantially identical grate portions with parallel round bars can be put together, with telescoping connecting rods provided on the outer sides of the two units.

An essential aspect for a grate is the possibility of cleaning. For hygienic and esthetic reasons the grate should be thoroughly cleaned after each use to remove fatty residues, dirt, soot and the like. Cleaning is all the more difficult the closer together the bars are. With profile bars, for example S-shaped bars, some parts of the bars are inaccessible to mechanical cleaning means (brushes). This is very serious particularly in view of carcinogenic residues on the grate.

The invention is based on the problem of providing an improved bipartite and telescoping grate that prevents fat from dripping through it, on the one hand, but also has its individual bars well accessible for purposes of cleaning, on the other hand. This problem is solved in a grate of the abovementioned type by the combination of features stated in the characterizing part of claim 1. This seemingly simple measure permits the bars to be disposed relatively close together, virtually preventing fat from dripping through, while the gap between two adjacent bars can be increased by pulling apart the two parts of the grate so that the individual bars of the two groups are readily accessible and can be effortlessly cleaned.

A further aspect in this connection is the variation in the supply of energy to the food being grilled. When the two groups of bars are pushed together forming a virtually closed surface the food to be grilled is heated more or less indirectly, with very little radiant heat passing directly from the charcoal to the food to be grilled. When the two groups of bars are pulled apart, however, larger gaps arise in one group of bars. Through these gaps radiant heat can pass directly from the charcoal to the food to be grilled. A particular advantage of the invention is that when the grate is pushed together the profile bars form a closed surface in projection with two adjacent bars partly overlapping. This is the case particularly with bars of substantially S-shaped cross section. While the grill is "closed" when the grate is pushed together there are gaps between two adjacent bars of one group through which radiant heat can pass from the coal to the food to be grilled.

The main aspect here, however, especially in connection with bars of S-shaped or Z-shaped cross section, is the question of mechanical cleaning.

When the two groups of bars are pulled apart the individual profiled metal sheets are exposed. Due to the partial overlapping of the profiled metal sheets the two parts of the grate with their respective groups of bars can be effortlessly pushed together and pulled apart. To avoid surface contact and obtain only linear contact if possible between the individual bars when the two groups of bars are displaced relative to each other, the bars are preferably bent out of sheet metal and have an angle of about 90° on a first bending line and an angle of about 100° on a second bending line.

Such bars can be readily produced from sheet iron. The different bending angles result in only linear contact when the two grill portions are shifted.

The bars of each group of bars are connected with their ends. This can be achieved by welding crossbars onto the top or underside, making sure the crossbars of one group are located on the underside and those of the other group on the top so as to permit the sliding motion of the two groups of bars, the bars of the group not connected with the crossbar being supported displaceably on this crossbar.

According to a preferred embodiment, however, welded on crossbars are at least partly avoidable if the one ends of one group of bars and the other ends of the other group of bars are connected by thin connecting members which connect the opposing sides of two bars in a substantially straight line.

These thin connecting members thus lie virtually in the plane defining two opposing sides of bars in one group of bars. There is thus no obstacle for brushing off the bars as there is with welded on crossbars.

In the following an embodiment example of the invention shall be explained in more detail with reference to the drawing, in which:

FIG. 1 shows a perspective partial representation of a grate,

FIG. 2 shows a schematic cross-sectional view of a grate,

FIG. 3 shows a perspective view of a grill utensil, and

FIG. 4 shows the two disassembled parts of a grate.

FIG. 3 shows grill utensil G with metal frame 25 resting on four feet, of which three feet 20, 21 and 22 are shown, and taking up grate R provided with handle 26. Below grate R there is a fireplace for charcoal not shown here.

Grate R in FIG. 3 is of bipartite design and can be pulled apart as shown schematically in FIG. 4. The individual bars are divided into two groups of bars with first half A of the grate in FIG. 4 containing the first, the third, the fifth, . . . bars and second half B of the grate in FIG. 4 containing the second, the fourth, the sixth, . . . bars. The two groups of bars can be welded together by crossbars as likewise shown in FIG. 4.

According to FIG. 4 the bars of half B are held together by welded on crossbars 31 and 32, while the bars of half A are held together by crossbars 33 and 34 welded on or under.

The individual bars of grate R are of substantially S-shaped cross section.

FIG. 2 shows in cross section part of the pushed together grate. Bars 1, 3 and 5 (further bars following on the right in the Figure are not shown in FIG. 2) belong to a first group of bars corresponding to half A of the grate shown in FIG. 4. Bars 2, 4, . . . . in FIG. 2 belong to a second group of bars corresponding to second half B of the grate in FIG. 4.

Individual bars 1, 2, 3, . . . have an identical cross section. They are produced from strips of sheet metal that are bent at two bending points in the longitudinal direction so as to form angle $\alpha$ of 90° between left outer leg 11 and central piece 12 and bending angle $\beta$ of 100° between central portion 12 and right outer leg 13 according to FIG. 2.

FIG. 1 shows the state in which the half of the grate with the group of even bars 2, 4, 6, 8, 10, . . . is pulled out of the first half of the grate containing the group of odd bars 1, 3, 5, 7, 9, . . . As a modification of the embodiment shown in FIG. 4, even bars 2, 4, . . . are connected in FIG. 1 by welded under crossbar 37 while odd bars 1, 3, 5, . . . are connected by small connecting pieces 40 added at the ends of the bars between two opposing sides of the bars so as to connect the two sides or legs of the bars in a virtually straight line. This way of connecting the ends of the bars, which is evidently not possible for even bars 2, 4, . . . in FIG. 1, offers the advantage that there are virtually no obstacles for cleaning. With a brush one can move beyond the ends of odd bars 1, 3, 5, . . . so that quick and easy cleaning is possible.

In FIG. 1 one can see charcoal indicated below grate R. One can also see that when the grill is pulled apart there are gaps between adjacent odd bars. Through these gaps radiant heat can pass directly from charcoal K to the food to be grilled lying only on odd bars 1, 3, 5, . . . .

Instead of heating with charcoal one can also heat with gas or use electric heating coils; combined heating with heating coils and charcoal is also possible.

The crucial point is that the profiles of the two halves of the grate are interconnected in such a way, for example by crossbars welded onto the ends, that the combined profiles in cross section form a free passage for the hot gases flowing through the grate. The profile cross section is only of importance in so far as the imbricate profiles must ensure that dripping fat does not pass into the burning space but is caught by the deeper profile and removed to the side. This overlapping in the vertical direction likewise prevents any flames from passing from the heating space to the top of the grate and burning the food being grilled.

The connection of the profile bars in the two halves of the grate is uncritical and can take place in many ways. What is crucial is only that the two halves of the grill can be drawn or pushed apart and that the space between the profile bars is defined such that combustion gases from the heating space can flow upward through the grate without hindrance.

I claim:

1. A bipartite, telescoping grate (R) having a plurality of bars (1, 2, 3, 4, 5, . . .) defining an upper grate plane for taking up food to be grilled, wherein said bars (1, 2, 3, 4, 5, . . . ) are profiled metal sheets which are of substantially Z- or S-shaped cross section and are combined in two groups of bars (A, B), the first group (A) containing the odd bars (1, 3, 5, . . . .) and the second group (B) containing even bars (2, 4, 6, . . .), and the bars of at least one group (A) or (B) being connected to form a moving unit (A, B) that is displaceable relative to the other group (B) or (A) in the longitudinal direction of the bars, and the adjacent profiled bars (1, 2, 3, 4, 5, . . .) of the two groups (A, B) pushed together to form the complete grate (R) partly overlapping so as to form a closed surface in projection.

2. The grate of claim 1, characterized in that the bars (1, 2, 3, 4, 5, . . .) are bent out of sheet metal and have an angle of about 90° on a first bending line and an angle of about 100° on a second bending line.

3. The grate of claim 1 wherein the ends of the bars (1, 3, 5, . . .) of the first group (A) and the bars (2, 4, 6, . . .) of the second group (B) are connected by thin connecting members (40) which connect the opposing sides of two bars in a substantially straight line.

4. The grate of claim 1, wherein the ends of the bars (1, 3, 5, . . .) of the first group (A) and the bars (2, 4, 6, . . .) of the second group (B) are connected by welded on crossbars (33, 34; 31, 32), and the bars of the group not connected with the crossbar are supported displaceably on this crossbar.

* * * * *